United States Patent [19]
Dassler et al.

[11] Patent Number: 5,796,485
[45] Date of Patent: Aug. 18, 1998

[54] METHOD AND DEVICE FOR THE MEASUREMENT OF OFF-CENTER ROTATING COMPONENTS

[75] Inventors: Hans-Ulrich Dassler, Oberschleissheim; Rüdiger Haas, Faistenhaar; Johann Lang, Schierling, all of Germany

[73] Assignee: Steinheil Industrielle Messtechnik GMBH, Ismaning, Germany

[21] Appl. No.: 676,206

[22] PCT Filed: Jan. 12, 1995

[86] PCT No.: PCT/DE95/00036

§ 371 Date: Jul. 17, 1996

§ 102(e) Date: Jul. 17, 1996

[87] PCT Pub. No.: WO95/19542

PCT Pub. Date: Jul. 20, 1995

[30] Foreign Application Priority Data

Jan. 18, 1994 [DE] Germany ............... 44 01 238.1

[51] Int. Cl.$^6$ .................................................. G01B 11/14
[52] U.S. Cl. .................. 356/373; 356/138; 356/153; 356/399; 356/400
[58] Field of Search ........................ 356/373, 138, 356/153, 399, 400

[56] References Cited

U.S. PATENT DOCUMENTS 4,480,918  11/1984  De Fazio .................. 356/373
4,880,992  11/1989  Niedmayr et al. .......... 356/373

FOREIGN PATENT DOCUMENTS 3831566   6/1993   Germany ........... G01B 11/00
4143187   7/1993   Germany ........... G01B 11/08
8607442  12/1986   WIPO .............. G01B 11/08

OTHER PUBLICATIONS

Patent Abstracts of Japan, vol. 9, No. 232 (P-389) (1955) 18 Sep. 1985 & JP, A, 60 088 307 (Shingijiyutsu Kaihatsu Jigiyoudan) 18 May 1985.

*Primary Examiner*—Frank G. Font
*Assistant Examiner*—Reginald A. Ratliff
*Attorney, Agent, or Firm*—Paul Vincent

[57] ABSTRACT

An apparatus and a method are presented in order to carry out an automatic optical inspection of an off-center rotating component to be measured. Using a measurement procedure which avoids mechanical contact having a source producing parallel rays and a detecting means, the off-center rotating component is rotated about a rotational axis, whereby a motion of the detecting means is synchronized with the rotation and is carried out in such a fashion that the separation, in the direction of an optical axis, between the off-center rotating component and the detecting means remains constant. In this manner optical distortions are avoided which would otherwise occur in the optical measurement procedure.

8 Claims, 4 Drawing Sheets

5,796,485

METHOD AND DEVICE FOR THE MEASUREMENT OF OFF-CENTER ROTATING COMPONENTS

BACKGROUND OF THE INVENTION

The invention concerns a method for the measurement of off-center rotating components of a measured object, whereby the measured object is supported in a rotatable fashion and rotates about a rotational axis and a measurement plane is defined perpendicular to the rotational axis within which the part of the measured object to be measured is irradiated with a parallel beam emanating from a radiative source, and having a detecting means for recording the silhouette of a cross section through the measured object in the measurement plane produced by the radiative source and the measured object, as well as an apparatus for carrying out the method.

An apparatus and a method of this kind have become known in the art by means of the international publication WO86/07442.

The method and apparatus which are known in the art are suitable for determining the dimensions of an elongated measured object. An optical electronic measuring station is proposed for the automatic dimensional control of outer rotating components by means of which the object to be measured is illuminated from below by an linear radiative source in order to produce an image of two diametrically opposed contour points on two linear photodiode arrays. The resulting intensity discontinuities give the two contour points and the shaft diameter can be determined by the electronically recorded separation between the two diode cells.

FIG. 1 shows the fundamental principle of the measurement in accordance with prior art. A radiative source 1 produces a beam 22 comprising parallel rays which illuminates an object to be measured 2 along an optical axis 8. The elongated measured object 2 rotates about a rotational axis which runs through the center 7 perpendicular to the plane of the drawing. A detecting means 3 comprises two separated detector elements 5, 5' whose separation with respect to each other is movable by means of a positioning means 4. Since the beam 22 comprises parallel rays, the position of the beam on the detector 5 produces a silhouette having an intensity profile. The sampled change in the intensity in the vicinity of the edge of the measured object allows, in concert with the electronically determined separation between the two detector linear photocell arrays 5, 5', for a precise dimensional measurement of the measured object. A repeated measurement of the diameter during the rotation facilitates a determination of the roundness of the measured object. With an apparatus in accordance with prior art the resolution for the diameter measurement assumes a value of one micron and the longitudinal precision assumes a value of 0.002 mm. With this apparatus it is possible to measure shafts in the diameter range from 7 to 100 mm having a length from 200 to 700 mm.

Although the measured diameters and roundnesses can be determined quite precisely, the apparatus and the method in accordance with prior art have the disadvantage that asymmetric measured components can not be measured to the required precision, since the rotation of such a component leads to errors in the measurement.

It is therefore the purpose of the present invention to improve an apparatus and a method of the above mentioned kind in such a fashion that rotating components having an asymmetric stroke support position can be measured sufficiently accurately.

SUMMARY OF THE INVENTION

This purpose is achieved in accordance with the method of the invention in that the rotational axis position is adjusted between the detecting means and the beam in such a fashion that the off-center rotating component which is to be measured is illuminated and initially, with a stationary detecting means, the maximum excursion of a diameter of the off-center rotating component is determined by means of a silhouette projection onto the detecting means, an angle of rotation of the off-center rotating component is determined, and the detecting means is synchronized with the position of the angle of rotation and moved parallel to the beam in such a fashion that the separation, parallel to the beam, between the detecting means and the rotating off-center component is kept constant.

The purpose of the invention is likewise realized by means of an apparatus for carrying out the method which exhibits: means for positioning the measurement plane so that it intersects the off-center rotating component to be measured, an angle measuring device to determine an angle of rotation of the off-center rotating component, a stroke means, which is configured in such a fashion that it can move the detecting means parallel to the beam, a synchronizer which synchronizes the stroke motion of the detecting means with the angular position of the off-center component and a computer to store, control and evaluate, whereby the detecting means are moved in such a fashion that the separation parallel to the beam, between the detecting means and the rotating off-center component is kept constant.

In this fashion the purpose of the invention is achieved. By means of a determination of the angular position of the rotating off-center component and by means of a synchronization of this angular position with a position of the detecting means movable parallel to the beam direction, the above mentioned measurement errors due to the changeable positions within the measuring optics can be avoided. During the rotation, an arbitrary point on the off-center rotating component to be measured exhibiting a given constant separation from the rotational axis describes a sinus-shaped motion relative to the optical axis while rotating in a circle about an off-center rotational axis. By means of a corresponding sinus-shaped motion of the detecting means relative to the rotational component, it is possible to maintain its separation, parallel to the beam, from the off-center rotational axis. By means of the measurement of the off-center rotating component at various angular positions during the rotation, it is possible for differing silhouette projections to be recorded, whereby the roundness of the off-center rotating component can also be determined.

It is particularly advantageous when the method is utilized to measure crank shafts. Such an application has the advantage that precision measurements of crank shafts can also be carried out automatically without mechanical contact.

It is also advantageous when the method is carried out to measure crank shafts having a plurality of off-center rotating components with a plurality of angles of rotation relative to each other. A utilization of the measurement procedure for the measurement of crank shafts of this kind has the advantage that even crank shafts having a complicated composition of off-center rotating components and exhibiting various angular positions with respect to each other can be measured automatically and without mechanical contact.

A particularly advantageous embodiment of the apparatus for carrying out the method utilizes two linear photodiode arrays to measure the off-center rotating component. This embodiment has the advantage that the advanced technology of CCD-cameras and laser scanners can be taken advantage of, whereby a plurality of individual measurements per rotation can be carried out.

In a variation of this embodiment, the apparatus exhibits a positioning means in order to adjust the separation between the two linear photodiode arrays. This variation has the advantage that even off-center rotating components with very differing diameters can be measured through the utilization of two adjustable linear photodiode arrays.

An advantageous embodiment of the apparatus for carrying out the method exhibits a positioning device in order to position the detectors transverse to the beam. This embodiment has the advantage that differing edges of the rotating off-center component can be detected at differing angles of rotation during the rotation so that the roundness of the off-center rotating component can also be determined.

Further advantages can be derived from the description and the accompanying drawings. The various features which are to be described can be utilized in other embodiments either individually or in arbitrary combination.

DESCRIPTION OF THE PREFERRED EMBODIMENT

Figure 1:
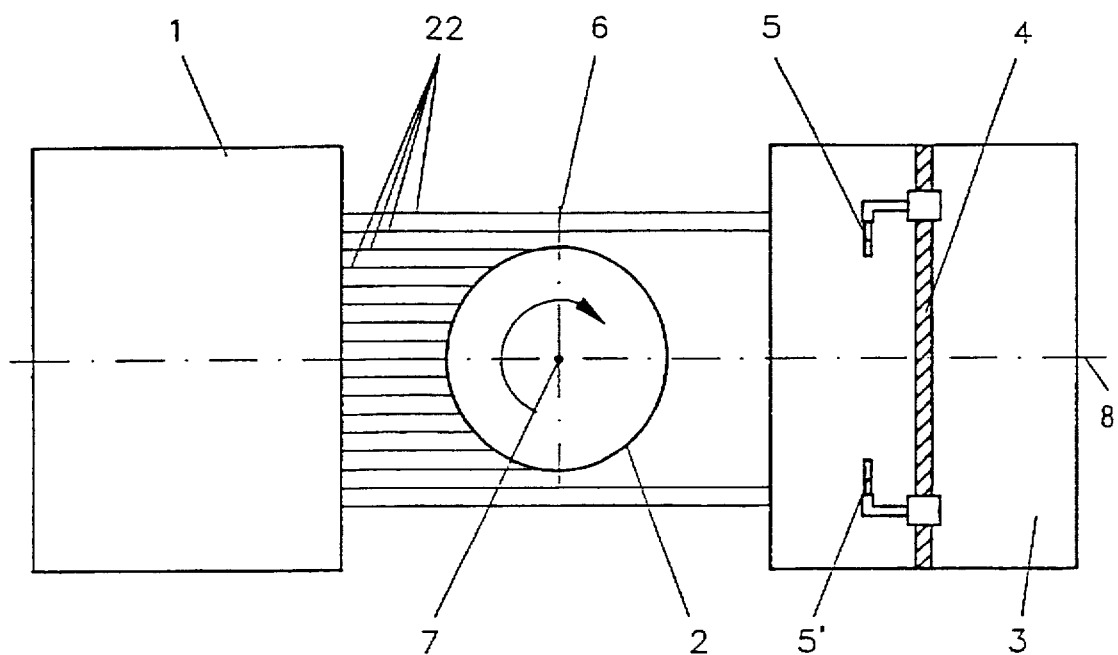
FIG. 1 shows a brief description of the measurement principle in accordance with prior art.

FIG. 1 describes the fundamental principle of the measurement in accordance with prior art. A radiative source 1 produces a largely parallel beam 22 which irradiates an object 2 to be measured in such a fashion that a silhouette is created on a detecting means 3 equipped with a detector 5, 5'. The vertical position of the detector 5, 5' as well as the separation between possible detector portions 5, 5' is adjusted by means of a transverse positioning means 4.

The roundness of the measured object 2 can be determined by a rotation of the measured object 2 about a rotational axis which runs perpendicular to the plane of the drawing through the rotation center 7 together with an analysis of the intensity discontinuities in detector 5, 5'. An optical axis 8 defines the parallel travel direction of the beam through the rotation center 7. A transverse axis 6 cuts the optical axis 8 in a perpendicular direction through the rotation center 7.

Although, due to the parallel optical path of the beam 22, the measured results, for example with regard to the diameter of the measured object 2, are largely insensitive to small displacements in the direction of the optical axis, large displacements of the measured object along the optical axis cause optical distortions which falsify or degrade the measured results. Consequently, when executing a measurement of a measured object having a off-center rotating component, it is initially not possible to carry out a precise measurement of the off-center rotating component without undertaking additional measures.

Figure 2A:
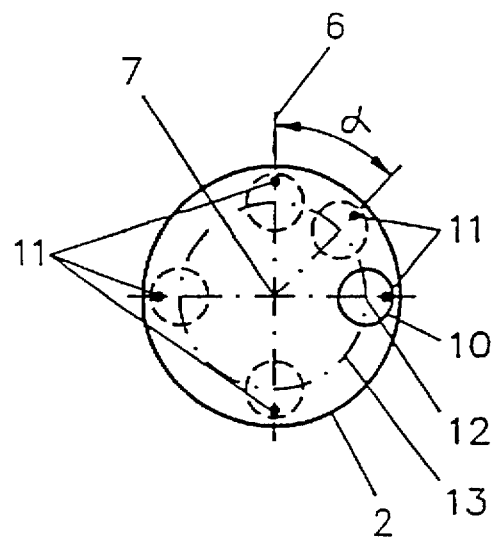
FIG. 2a shows a cross section in a plane perpendicular to rotational axis of an off-center rotating component to be measured.

FIG. 2a shows a cut in the measurement plane corresponding to the plane of the drawing of FIG. 1 of an object to be measured 2 having an off-center rotating component. The off-center rotating component 10 rotates, in this embodiment, about the rotation center 7 on an off-center stroke circle 13. In many cases, for example in the case of a crank shaft, a point 11 on the edge of the off-center rotating component also describes a circular motion about the rotation center 7 during the rotation of the measured object. In this fashion the off-centered rotating component also exhibits its own off-center rotation center 12 which, for its part, describes an off-center stroke circle 13 about the rotation center 7. During the rotation the off-center rotation center 12 exhibits a changing angle a relative to the transverse axis 6 which, for its part, is perpendicular to the optical axis 8.

Figure 2B:
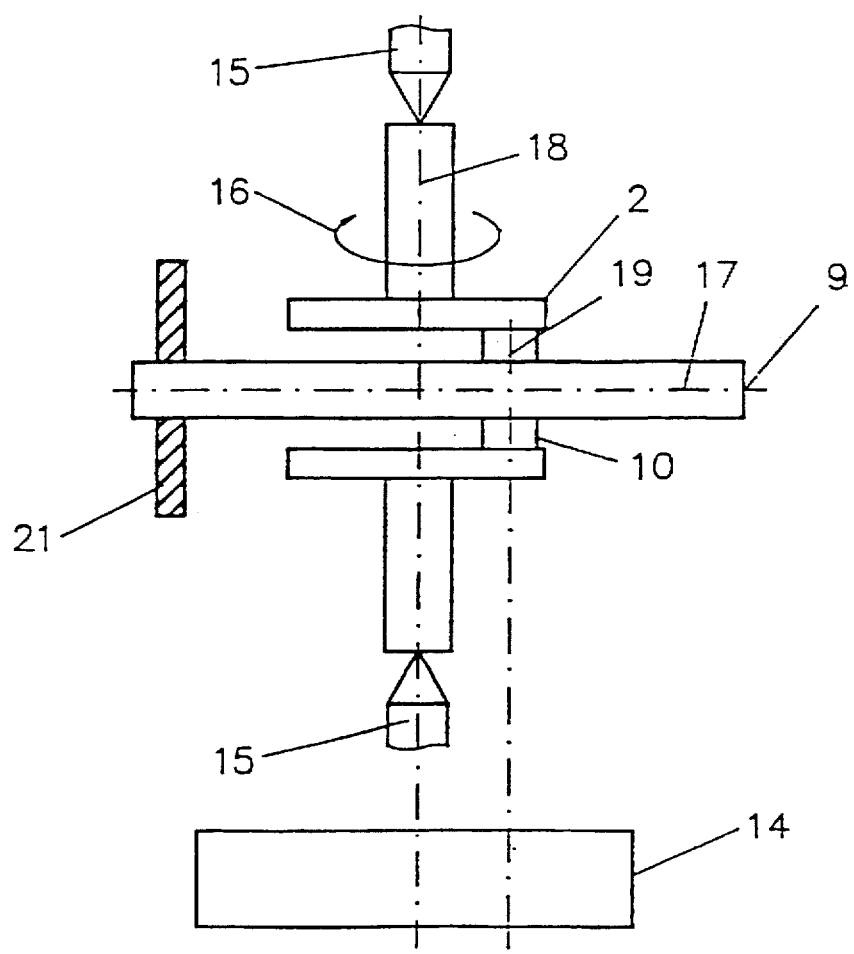
FIG. 2b shows a side view of the rotating component to be measured of FIG. 2a with accompanying rotation and detection components.

FIG. 2b shows a side view of the apparatus. The measured object 2 is supported in a rotatable fashion between rotation means 15 in such a manner that a rotation in the rotation direction 16 about the rotational axis 18 is carried out. During the rotation the off-center rotational axis 19 and the off-center component 10 describe a cylindrical motion about the rotational axis 18 so that a cylinder-shaped surface is swept-out during a rotation of the off-center component. An optical housing 9 is arranged in the vicinity of the off-center component 10 in such a fashion that a precise measurement of the diameter or the roundness of the off-center rotating component 10 can be carried out. A rotational axis positioning means 21 adjusts the position of the optical housing 9 along the rotational axis 18. An angle measuring device 14 is arranged in such a fashion that the angular position or the angle of rotation α of the rotating off-center component is recorded in real time. The measuring plane 17, in which the cross sections according to FIGS. 2a, 3a, 3b and 3c lie, is indicated in FIG. 2b.

Figure 3A:
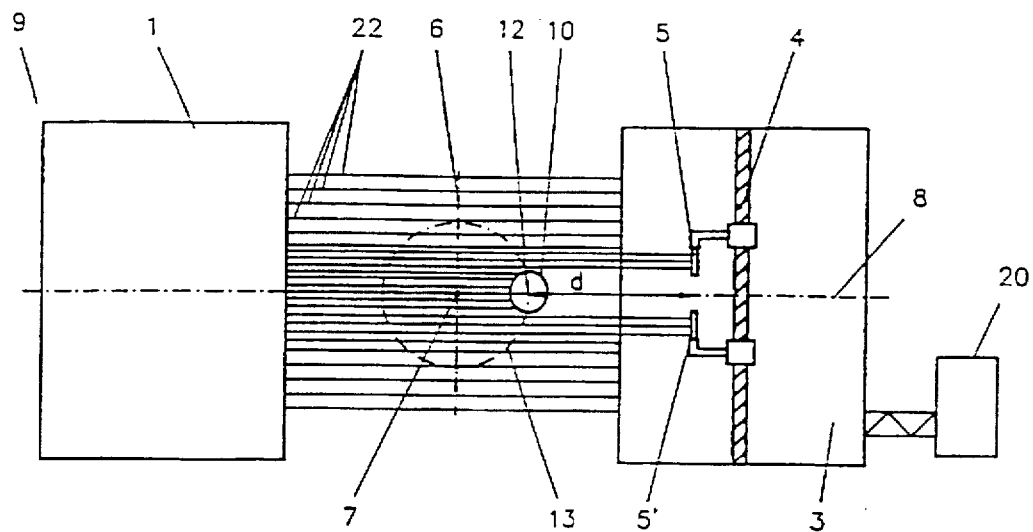
FIG. 3a shows a side view in the measurement plane where the off-center component to be measured lies on the optical axis at maximum separation from the radiative source.
Figure 3B:
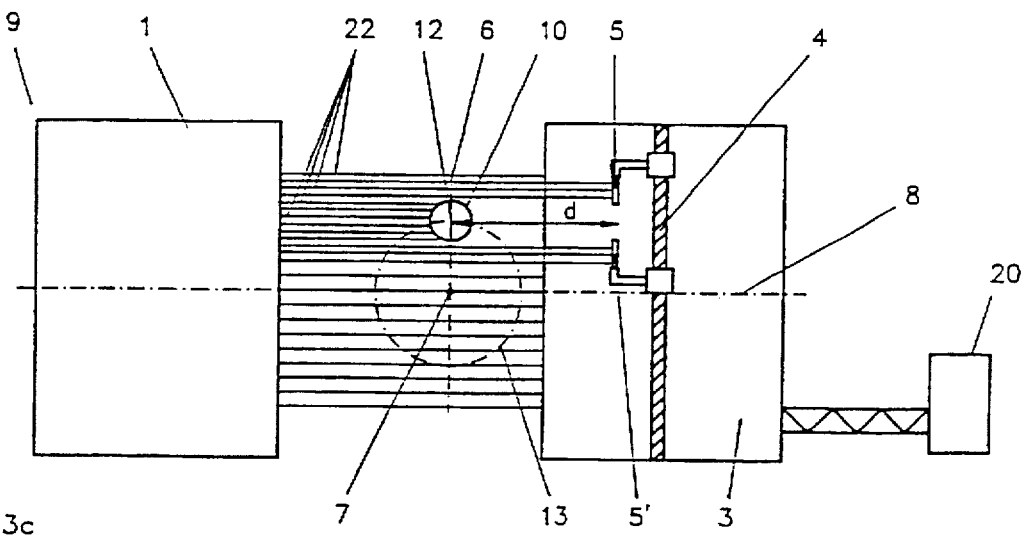
FIG. 3b shows a representation of the measurement configuration for the case where the off-center component to be measured assumes an angle of 90° relative of that of FIG. 3a during rotation.
Figure 3C:
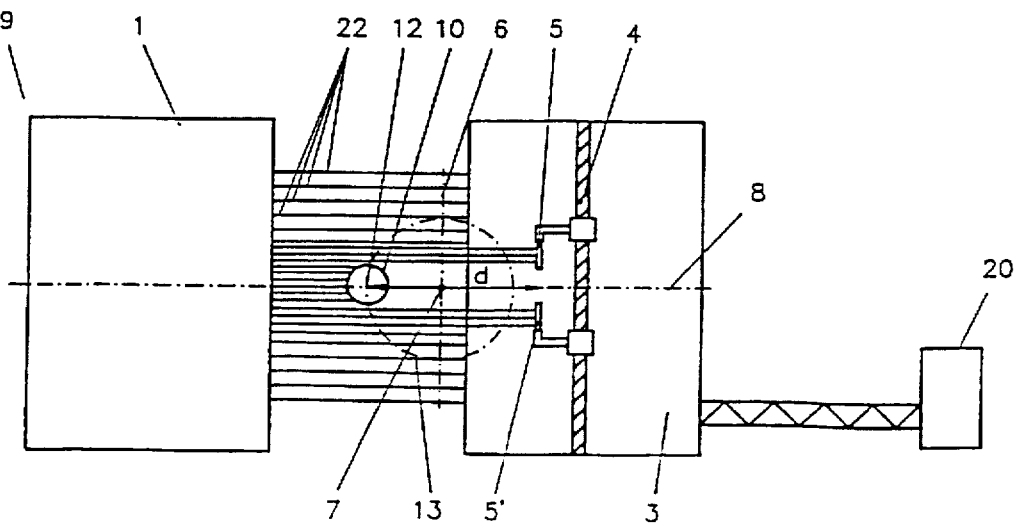
FIG. 3c corresponds to the configuration of FIGS. 3a and 3b but for the case where the off-center rotating component to be measured is on the optical axis and as close as possible to the source.

In the event that a measurement is carried out in the measurement plane 17 the following steps are executed in accordance with FIGS. 3a, 3b, 3c. FIG. 3a shows the contents of the optical housing 9 having a radiative source 1 which produces the parallel beam 22. During the rotation of the measured object, the off-center component 10 describes an off-center stroke circle 13 about the rotation center 7, whereby a separation d, parallel to the optical axis 8, obtains between the off-center rotation center 12 and the detector 5, 5'. The rotating off-center rotation center 12 is, in FIG. 3a, located precisely on the optical axis 8. Via the transverse positioning means 4 the detectors 5, 5' of the detecting means 3 are positioned in such a fashion that the silhouette of the off-center component 10 which is produced by the projection of the beam 22 is recorded with the detectors 5, 5'. The detectors 5, 5' are suitable for detecting the radiation from the radiative source 1 and the intensity profile of the silhouette. The intensity measurements of the detector in the shadow of the off-center component 10 are, with the exception of a possible small background, zero. Outside of the shadow the intensity naturally corresponds to the complete intensity of the source. Consequently, a sharp intensity profile change occurs precisely at that position where the projection of the edge of the measured object onto the detector plane 5, 5' is produced. The separation d is adjusted by means of a stroke means 20 which will be further described below.

During the rotation the position of the off-center component moves, for example, into the position shown in FIG. 3b. In FIG. 3b the rotating off-center component 10 is precisely in the vertical position, e.g. the off-center center 12 lies on the transverse axis 6. If then, via the transverse positioning means 4, the detectors 5, 5' of the detecting means 3 are adjusted in such a fashion that the sharp intensity change of the silhouette can be detected, a silhouette profile corresponding to the diameter of the measured object is imaged on the detector 5, 5'. The angular position a between the off-center center 12 and the transverse axis 6 (see FIG. 2a) then has, in this position, a value $\alpha=0$ and, consequently, the off-center rotating component 10 has moved in the direction towards the radiative source 1. Stroke means 20 is, however, adjusted accordingly so that the detecting means are displaced towards the radiative source in such a fashion that the separation d is maintained or kept constant. In this manner optical distortions due to a changing separation between the detector and the off-center component to be measured are avoided.

If one continues to rotate further in accordance with FIG. 3c, then the off-center component 10 is located in a position having an angle of rotation $\alpha=270°$. The stroke means 20 displaces the position of the detecting means 3 towards the source in such a fashion that the separation d between the off-center rotation center 12 and the detector 5 remains constant. In the event that detector configuration 5, 5' is changed via the transverse positioning means 4 in such a fashion that the silhouette of the off-center component can be detected, a measuring result in accordance with FIG. 3c can be utilized, in combination with FIG. 3a and 3b, to record three diameter measurements of the off-center component 10 and to thereby check the roundness or the eccentricity. The transverse positioning means 4 is also suitable for changing the separation between the two detector parts, for example 5, 5', so that objects of most differing diameters can also be measured.

Figure 4:
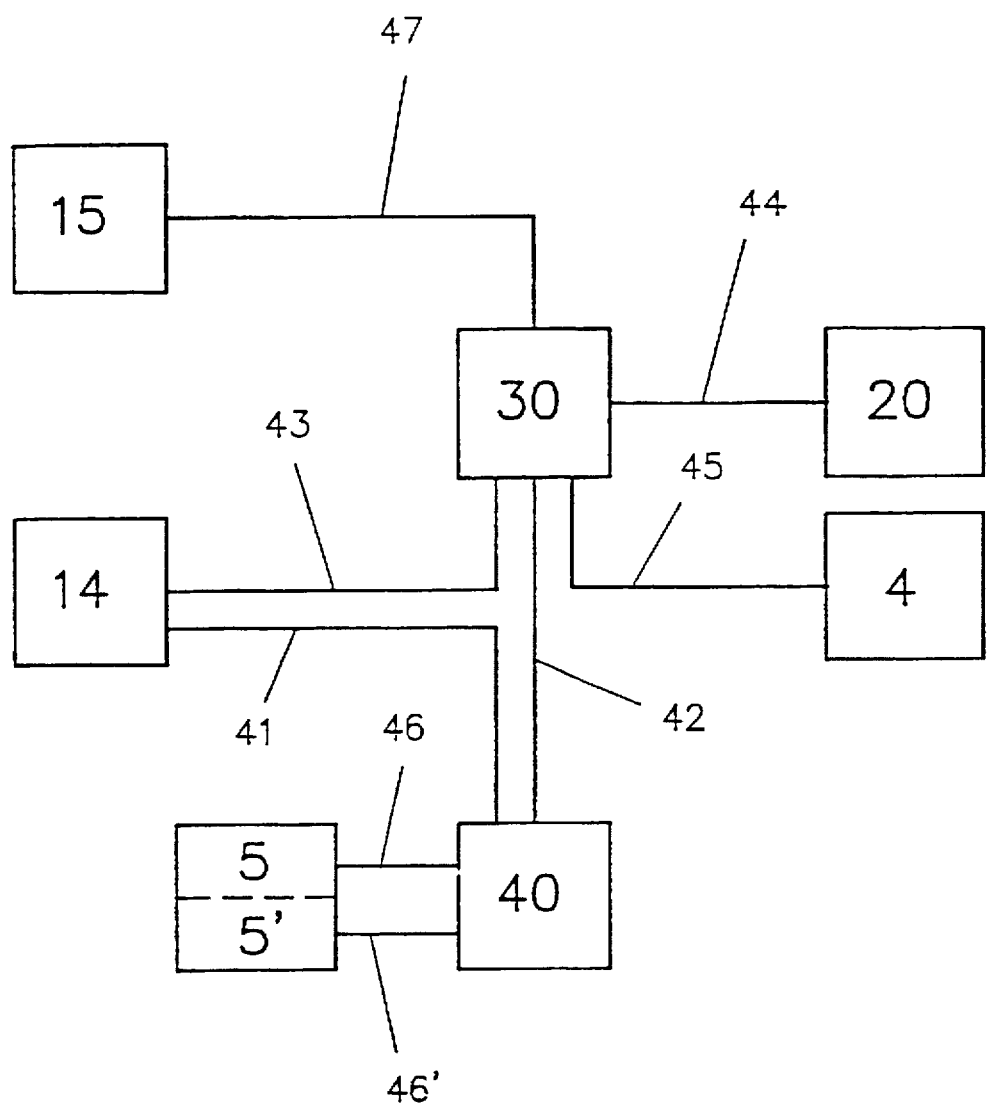
FIG. 4 shows a schematic representation of the connections between control components and the synchronized components in accordance with the invention.

FIG. 4 shows a schematic diagram of the cooperation and control between the differing components of the system. The synchronizer 30 is connected by means of conductor 47 to the rotation means 15 as well as to the angle measuring device 14 via conductor 43. A connection 44 between the synchronizer 30 and the stroke means 20 allows for the stroke means 20 to be adjusted in such a fashion that the separation parallel to the optical axis 8 between the off-center rotating component and the detecting means is kept constant. The position of the angle of rotation is detected by means of the angle measuring device 14. Additional connections 45 and 42 are shown in FIG. 4 between the synchronizer the transverse positioning means 4, and the computer 40, respectively. Connection 45 facilitates a synchronization of the transverse positioning means 4 with the angle measuring device 14 so that a motion perpendicular to the optical axis, e.g. parallel to axis 6, can also be synchronized with the rotation of the off-center rotating component. Synchronization information is stored via conductor 42 and computer 40. Computer 40 stores, controls and evaluates information. The angle of rotation position a is stored via conductor 41 and the intensity profile of the silhouette detected by detector 5, 5' is read out or stored via conductor 46 or 46'. Clearly, additional conventional connections between the computer 40 and the various components of the system in accordance with FIGS. 2 through 3c are possible in order to effect an automatization of the measuring process.

It is possible, with the method and apparatus in accordance with the invention, to monitor diameters and to measure diameters with a precision of approximately 1 micron. Measurements of this type can, for example, be carried out on measured objects having lengths between 0 and 3000 mm and having diameters between 0 and 1000 mm. Measurement of off-center rotating components can be carried out on, for example, crank shafts. The detecting means 5, 5' can have photocells connected to an optical CCD camera or a laser scanner. With a pixel read-out frequency of, for example, 10 MHz, a sample frequency of 5 KHz is to be expected. With a measured object rotational frequency of 1 Hz, 5000 samples per rotation are possible. Stroke throws of the off-center rotating component of, for example, ±200 mm can be measured with this method and with this apparatus.

We claim:

1. A method for measurement of an off-center rotating component of a measured object comprising:

supporting the measured object for rotation about a rotation axis;

illuminating the measured object with a parallel beam from a radiation source within a measurement plane perpendicular to said rotation axis;

detecting, using detecting means, a silhouette of a cross section through the measured object;

determining a position of said rotation axis relative to said detecting means;

adjusting said measurement plane to intersect the off-center rotating component;

measuring, with stationary detecting means, a maximum excursion of a diameter of the off-center rotating component;

observing an angle of rotation of the off-center rotating component; and moving said detecting means parallel to said beam to keep a constant separation, parallel to said beam, between said detecting means and said off-center rotating component.

2. The method of claim 1, wherein the measured object is a crank shaft.

3. The method of claim 2, wherein said crank shaft comprises a plurality of off-center rotating components having a plurality of relative angles of rotation.

4. An apparatus for measurement of an off-center rotating component of a measured object comprising:

a rotatable support device for supporting the measured object in a rotatable fashion.;

means for defining a measurement plane perpendicular to a rotational axis;

a radiative source producing a parallel beam in said measurement plane;

a detecting means arranged for detecting a silhouette of a cross section of the measured object produced by said beam and the measured object;

means for positioning said measurement plane to intersect the off-center rotating component;

an angle measuring device for determining an angle of rotation of the off-center component;

a stroke means for moving said detecting means parallel to said beam;

a synchronizer for synchronizing a stroke motion of said detecting means with said angle of rotation of the off-center component; and computer means for storing, controlling and evaluating, wherein said detecting means is moved in such a fashion that a separation, parallel to the beam, between said detecting means and the rotating off-center component is kept constant.

5. The apparatus of claim 4, wherein the measured object is a crank shaft.

6. The apparatus of claim 4, wherein said detecting means comprises a detector having at least one of a linear photodiode array and a laser scanner.

7. The apparatus of claim 6, wherein said detecting means comprises two linear photodiode arrays and further comprising positioning means to adjust a separation between said two linear photodiode arrays.

8. The apparatus of claim 4, further comprising a positioning means to position said detecting means within said measurement plane in a direction transverse to said beam.

* * * * *